US009292313B2

(12) United States Patent
Araki et al.

(10) Patent No.: US 9,292,313 B2
(45) Date of Patent: Mar. 22, 2016

(54) DETECTION OF COMPONENT OPERATING STATE BY COMPUTER

(71) Applicant: International Business Machines Corporation, Armonk, NY (US)

(72) Inventors: Hiroshi Araki, Tokyo (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/022,674

(22) Filed: Sep. 10, 2013

(65) Prior Publication Data

US 2014/0101432 A1   Apr. 10, 2014

(30) Foreign Application Priority Data

Oct. 10, 2012   (JP) .................................. 2012-225435

(51) Int. Cl.
*G06F 3/00*     (2006.01)
*G06F 13/00*    (2006.01)
(Continued)

(52) U.S. Cl.
CPC ........ *G06F 9/44505* (2013.01); *G06F 11/3055* (2013.01); *G06F 11/3072* (2013.01); *G06F 11/3476* (2013.01); *G06F 2201/81* (2013.01)

(58) Field of Classification Search
CPC ... G06F 9/44505; G06F 11/00; G06F 11/008; G06F 11/30
USPC .......... 710/5, 15–16, 19, 33; 707/6, 758, 761, 707/780; 717/143, 107, 108
See application file for complete search history.

(56) References Cited

U.S. PATENT DOCUMENTS 5,862,309 A * 1/1999 Duniho ......................... 358/1.16
6,775,024 B1 * 8/2004 Fischer ......................... 358/1.15
(Continued)

FOREIGN PATENT DOCUMENTS

JP        04061496 A    2/1992
JP     2000092053 A    3/2000
(Continued)

OTHER PUBLICATIONS

Muzatko, Pavel. "Approximate Regular Expression Matching." Proceedings of the Prague Stringology Club Workshop '96, Aug. 1996, pp. 37-41. Accessed at < http://www.stringology.org/publications.html> on Jul. 22, 2015.*

(Continued)

*Primary Examiner* — Farley Abad
*Assistant Examiner* — Henry Yu
(74) *Attorney, Agent, or Firm* — Francis Lammes; Stephen J. Walder, Jr.; Randall J. Bluestone

(57) ABSTRACT

A mechanism is provided for detecting an operating state of a component. A CLI command is transmitted via a command line interface to the component. An output character string is received responsive to the CLI command. A set of significant character substrings is dissected from the output character string, where each significant character substring comprises a label character string indicating a meaning of the output character string and a data character string expressing data of the output character string. A regular expression corresponding to each significant character substring is set thereby forming a set of regular expressions. A difference is calculated between each of the set regular expressions and each significant character substring corresponding to the regular expression as a character string distance. Each calculated character string distance is compared to a corresponding predetermined threshold and the operating state of the component is output based on results of the comparison.

18 Claims, 4 Drawing Sheets

(51) Int. Cl.
*G06F 7/00* (2006.01)
*G06F 9/44* (2006.01)
*G06F 9/45* (2006.01)
*G06F 9/445* (2006.01)
*G06F 11/30* (2006.01)
*G06F 11/34* (2006.01)

(56) References Cited

U.S. PATENT DOCUMENTS

| | | | |
|---|---|---|---|
| 7,949,670 B2* | 5/2011 | Sudhakar | 707/761 |
| 2002/0002634 A1 | 1/2002 | Ueoka et al. | |
| 2003/0023873 A1* | 1/2003 | Ben-Itzhak | 713/201 |
| 2005/0060693 A1* | 3/2005 | Robison et al. | 717/143 |
| 2005/0076013 A1* | 4/2005 | Hilbert | G06Q 10/10 |
| 2005/0107999 A1* | 5/2005 | Kempe et al. | 704/9 |
| 2005/0132342 A1* | 6/2005 | Van Lunteren | 717/143 |
| 2007/0263773 A1* | 11/2007 | Malik et al. | 379/1.01 |
| 2007/0282833 A1* | 12/2007 | McMillen | 707/6 |
| 2008/0071783 A1* | 3/2008 | Langmead | H04L 63/1416 |
| 2008/0228466 A1 | 9/2008 | Sudhakar | |
| 2011/0066908 A1 | 3/2011 | Bartz et al. | |
| 2011/0185077 A1* | 7/2011 | Bremler-Barr | H03M 7/3086 709/231 |
| 2012/0311529 A1* | 12/2012 | Beveridge et al. | 717/107 |
| 2013/0262493 A1* | 10/2013 | Atasu | G06F 17/30985 707/758 |
| 2013/0325884 A1* | 12/2013 | Soel et al. | 707/758 |

FOREIGN PATENT DOCUMENTS

| | | |
|---|---|---|
| JP | 2002014849 A | 1/2002 |
| JP | 2010-271875 | 12/2010 |
| JP | 2012-256282 | 12/2012 |

OTHER PUBLICATIONS

PCT International Search Report dated Dec. 3, 2013, International Application No. PCT/JP2013/073504, includes partial translation, 5 pages.

Notification of Transmittal of Translation of the International Preliminary Report on Patentability (PCT/IB/338) dated Apr. 23, 2015, International Preliminary Report on Patentability (PCT/IB/373) dated Apr. 14, 2015, and partial translated version of the Written Opinion of the International Searching Authority (PCT/ISA/237) dated Dec. 3, 2013, International Application No. PCT/JP2013/073504, 6 pages.

* cited by examiner

*FIG. 3*

```
[root@st001.mgmt001st001 ~]# df
Filesystem      1K-blocks        Used     Available    Use%  Mounted on
/dev/sda2       13457172     115357916     1235664     91%   /
tmpfs            2292444             0     2292444      0%   /dev/shm
/dev/gpfs0       3145728        923392     2222336     30%   /ibm/gpfs0
```

*FIG. 4*

```
[Filesystem][    ][1K-blocks][      ][Used][  ][Available][    ][Use%][ [Mounted on]
[/dev/sda2][     ][13457172][  ][115357916][  ][1235664][       ][91%][ [/]
[tmpfs][         ][2292444][          ][0][   ][2292444][        ][0%][ [/dev/shm]
[/dev/gpfs0][    ][3145728][      ][923392][  ][2222336][       ][30%][ [/ibm/gpfs0]
``` excellent# DETECTION OF COMPONENT OPERATING STATE BY COMPUTER

BACKGROUND

The present invention relates to detection of a component operating state by a computer in a computer system, and more specifically to detecting an operating state of a component that used a command line interface command (referred to below as "CLI command") by the computer.

As computer systems increase in size, a plurality of general modules and devices are combined to form systems. In order to evaluate the operating status of the modules and devices in this type of system, a program that invokes a CLI command provided in the modules and devices and analyzes the output character string given by the CLI command (hereinafter referred to as "output analysis program") can be created and used.

In order to properly create the output analysis program, the output format for the CLI command must be known, but normally knowing the detailed and rigorous output format for the CLI command is extremely difficult. Therefore, programming is performed that matches the output format for the actual CLI command at a certain time. Therefore, if the output format of the CLI command has changed, there is a possibility that the output analysis program may not properly operate. For example, the output analysis program might suddenly stop operating because the output format of the CLI command changed during testing (the computer system).

The output analysis program is made to monitor the system status, so if the output analysis program stops operating, there will be a major impact on system testing. This is because there may be a need to confirm that the system operates properly on a test before executing a test of the system for example, but if the output analysis program is not operating, this confirmation cannot be made.

SUMMARY

An object of the present invention is to resolve or reduce problems with the use of a conventional output analysis program, and to enable detection and confirmation of the operating status of a system (components, modules, devices, and the like) for testing, by analyzing and output character string for the CLI command even if the output format for the CLI command has changed.

In one illustrative embodiment, a method, in a computing system, is provided for detecting an operating state of a component in the computer system comprising a plurality of components. The illustrative embodiment transmits a command line interface (CLI) command to the component. The illustrative embodiment receives an output character string from the component responsive to the CLI command. The illustrative embodiment dissects a set of significant section character substrings from the output character string, where each significant character substring comprises a label character string indicating a meaning of the output character string and a data character string expressing data of the output character string. The illustrative embodiment sets a regular expression corresponding to each significant character substring of the set of significant character substrings thereby forming a set of regular expressions. The illustrative embodiment calculates the difference between each of the set regular expressions and each significant character substring corresponding to the regular expression as a character string distance. The illustrative embodiment compares each calculated character string distance to a corresponding predetermined threshold. The illustrative embodiment outputs the operating state of the component based on results of the comparison.

With the method of the present invention, the output character string for a CLI command from the component is dissected into significant character substrings, each of the significant character substrings are compared to corresponding regular expressions, and the operating state of the component is detected, and therefore even if the output format for the CLI command changes, the operating state of the component can be detected and output.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

FIG. 3 is a diagram depicting an embodiment of an output character string for a CLI command;

FIG. 4 is a diagram of an embodiment where the output character string of FIG. 3 is dissected into significant character substrings;

DETAILED DESCRIPTION

Figure 1:
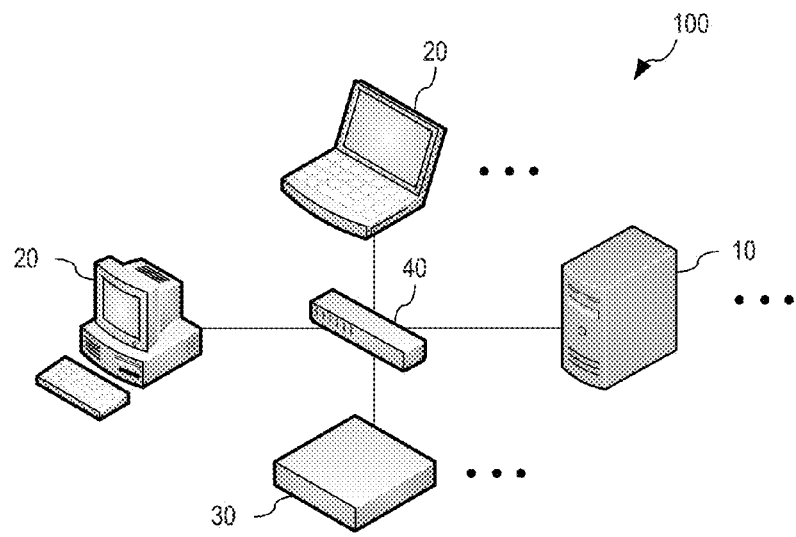
FIG. 1 is a block diagram illustrating an example of the configuration of a computer system where the method of the present invention is implemented.

An embodiment of the present invention is described while referring to the drawings. FIG. 1 is a diagram illustrating an example of the configuration of a computer system where the method of the present invention is implemented. A system 100 includes a host (server) 10, a PC (terminal) 20, and a network drive 30 that are mutually and communicably connected through an Ethernet (registered trademark) switch (LAN switch) 40. The network drive 30 includes recording means such as an HDD, a tape drive, or the like. These devices can be one of the "components" used in the present invention, or a module or device associated with each device can also be one of the "components." In FIG. 1, only one each of the host (server) 10, PC (terminal) 20, and network drive 30 are depicted, but this is only an example, and naturally an arbitrary number of two or more of each device can be included.

The method of the present invention is implemented by the PC 20 accessing and executing software downloaded from the server 10 or network drive 30, or software stored in recording means (HDD and the like) included in the PC itself for example. Note that naturally the method of the present invention can be implemented by a standalone PC not connected to a network.

Figure 2:
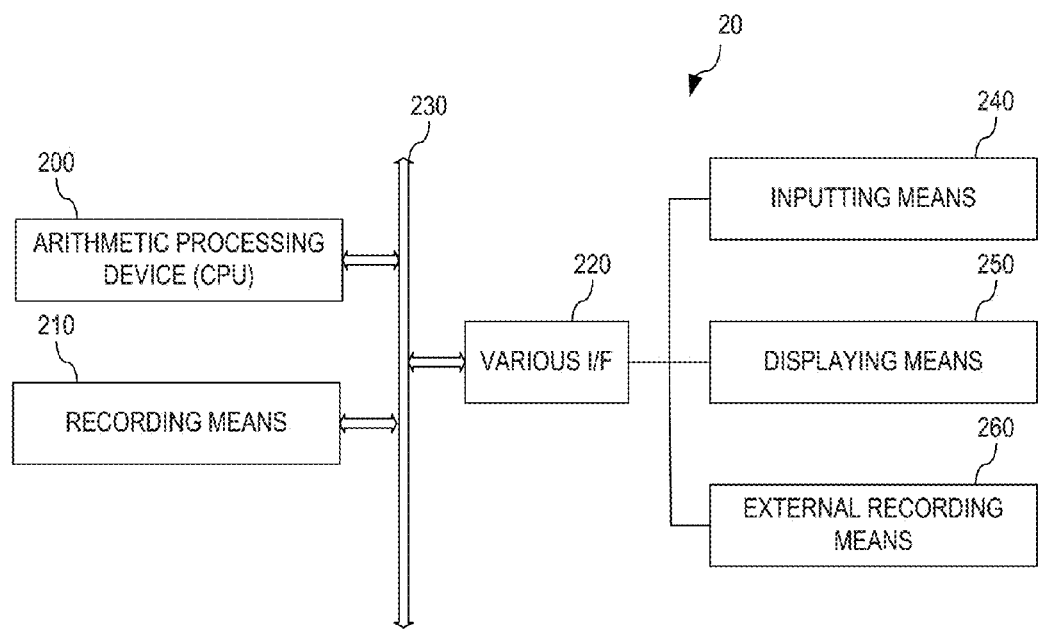
FIG. 2 is a diagram illustrating an example of the configuration of a computer that executes the method of the present invention.

FIG. 2 is a block diagram illustrating an example of the configuration of a computer executing the method of the present invention. FIG. 2 illustrates an example of the configuration of the PC 20 of FIG. 1. The PC 20 includes an arithmetic processing device (CPU) 200, recording means 210, and various interfaces (I/F) 220 that are mutually connected through a bus 230. Various I/F 220 is used as a general term including input I/F, output I/F, external memory I/F, external communication I/F, and the like, and each I/F is connected to corresponding inputting means 240 such as a keyboard, mouse, and the like, displaying means 250 such as a CRT, LCD, and the like, and external recording means 260 such as a semiconductor memory, HDD, and the like connected by USB. The recording means 210 can include a semiconductor memory such as RAM and ROM, or an HDD, or the like.

Herein, each of the terms used in the method of the present invention are described. In the following description, an example is described using df command used in a Linux (registered trademark) system as a CLI command. The df command is a command for outputting information of a file system (remaining disk space and the like) mounted by the system. Note that the CLI commands that can be used in the present invention are not limited to df commands, and can be any other CLI command.

(A) Output Character String

FIG. 3 depicts an embodiment of an output character string for the df command. "Filesystem" in the first column indicates the file system (device) name. "1K-blocks" in the second column indicates the maximum size (capacity). "Used" in the third column indicates the size that is used. "Available" in the fourth column indicates the available size (remaining capacity). "Use %" in the fifth column indicates the percentage (%) of the size that is used. "Mounted on" in the sixth column indicates the mount point of the device. In each column, actual data is shown from the second row. For example, "Use %" in the fifth column indicates that 91% is used in device: /dev/sda2, 0% is used in device: tmpfs, and 30% is used in device: /dev/gpfs0.

(B) Significant Character Substring

An embodiment where the output character string for the df command in FIG. 3 is dissected into significant character substrings is depicted in FIG. 4. In FIG. 4, each section that is enclosed with [ . . . ] corresponds to a significant character substring. The significant character substring indicates a character substring with meaning in the output character string. The character substring with meaning can be classified as follows for example:

(i) Character string expressing the meaning of the data ("Filesystem", "Used", and the like)

(ii) Character string expressing the data itself ("/dev/sda2", "115357916", and the like)

(iii) Character string for making the output easier to view (blank section, delimiter, line break, and the like)

Herein, for the (i) character string expressing the meaning of the data, the same output can always be expected to appear regardless of the environment and timing for executing a command, so as a matter of convenience, the character string can be referred to as a label character string. Furthermore, for the (ii) character string expressing the data itself and the (iii) character string for making the output easier to view, the output can be altered based on the environment and timing for executing a command, so as a matter of convenience, these can be referred to as data character strings.

(C) Regular Expression

Concerning each significant character substring, "the type of data that can be output" can be inferred by actually executing the CLI command and looking at that output. Based on this information, a regular expression that matches the actual output can be defined for each significant character substring of the CLI command. For example, consider the "Used %" column from the output of the aforementioned df command. Without knowing a detailed definition of the df command output, from the character string "Use %" and the like, it can be inferred that the column indicates the amount used in the corresponding file system, by percentage. Therefore, the value of the "Use %" column can be presumed to be "an integer percentage value within a range of 0% to 100%."

Furthermore, by executing the df command a plurality of times, the fact that the end of the value always ends in % can also be confirmed. Therefore, the expected value is "(0|[0-9][0-9]|100)%" when a regular expression generally used by a Unix (registered trademark) system appears in this column, for example. Herein, 0 and 100 indicate the range of 0 to 100%, and [0-9] and [0-9] indicate an integer where the first digit is from 0 to 9, and similarly where the second digit is from 0 to 9.

Thereby, all significant character substrings can be defined as a regular expression that matches a substring that corresponds to the actual output as long as the format of the command output does not change. Herein, it should be noted that in the present invention, the specification of the output format is presumably unknown, so the regular expression is uniquely undetermined. For example, in the case of the aforementioned "Use %" column, output of a real number value such as "99.5%" is not permitted, but may actually be possible. Therefore, in the case that a regular expression is determined, preferably the regular expression should not match with "data in need of warning or suspension."

(D) Character String Distance

The following words are defined first in order to calculate the character string distance. An actual output of a certain CLI command C at a certain point is O(C), and the list of the significant character substring in O(C) is O=(o1, o2, ..., oN). Expected output P is defined as an output that can be expected when the CLI command C is executed (invoked). Note that P is a ternary containing (E, A, B) as defined below:

$E=(e1, e2, \ldots, eN)$: $ei$ is a regular expression for the $i$th significant character substring.

$A=\{i | i\text{th significant character substring is a label character string}\}$ $B=\{i | i\text{th significant character substring is a data character string}\}$

$A+B=E$ and $A \cap B=$empty set so $B$ is not needed, but as a matter of convenience for the description, both $A$ and $B$ are introduced.

For example, when taking a significant character substring (91%) located in the 20th row of "Use %" of the significant character substring of the df command illustrated in FIG. 4 as an example, the o20 and e20 from O=(o1, o2, ..., oN) and E=(e1, e2, ... eN) can be expressed as:

$o20=91\%$ $e20=(0|[0-9][0-9]|100)\%$

A significant character substring (oi) in a different order (i) can be expressed similarly, Next, D (ei, oi), the character string distance of ei and oi, where i is $1 \leq i \leq N$, is defined as a function with the following properties.
  (i) D (ei, oi)=0 when the actual output oi matches the defined regular expression ei.
  (ii) D (ei, oi) is larger as the actual output oi is more different from the defined regular expression.
  (iii) D (ei, oi) is a real number of 0 or higher For example, the character string distance D (ei, oi can be calculated by using Edit Distance. For example, using the case where o20=91% and e20=(0|[0-9] [0-9]|100)% in the aforementioned "Use %" column as an example, if the actual output does not have "%", or if the number is 3 digit numeral other than 100 such as "105%", then D(e20, o20)=1, but if both of these happen together (no % and a 3 digit number of over 100), then D(e20, o20)=2; and thus the character string distance D(ei, oi) is calculated such that the numerical value becomes larger as these points of difference increase.

Figure 5:
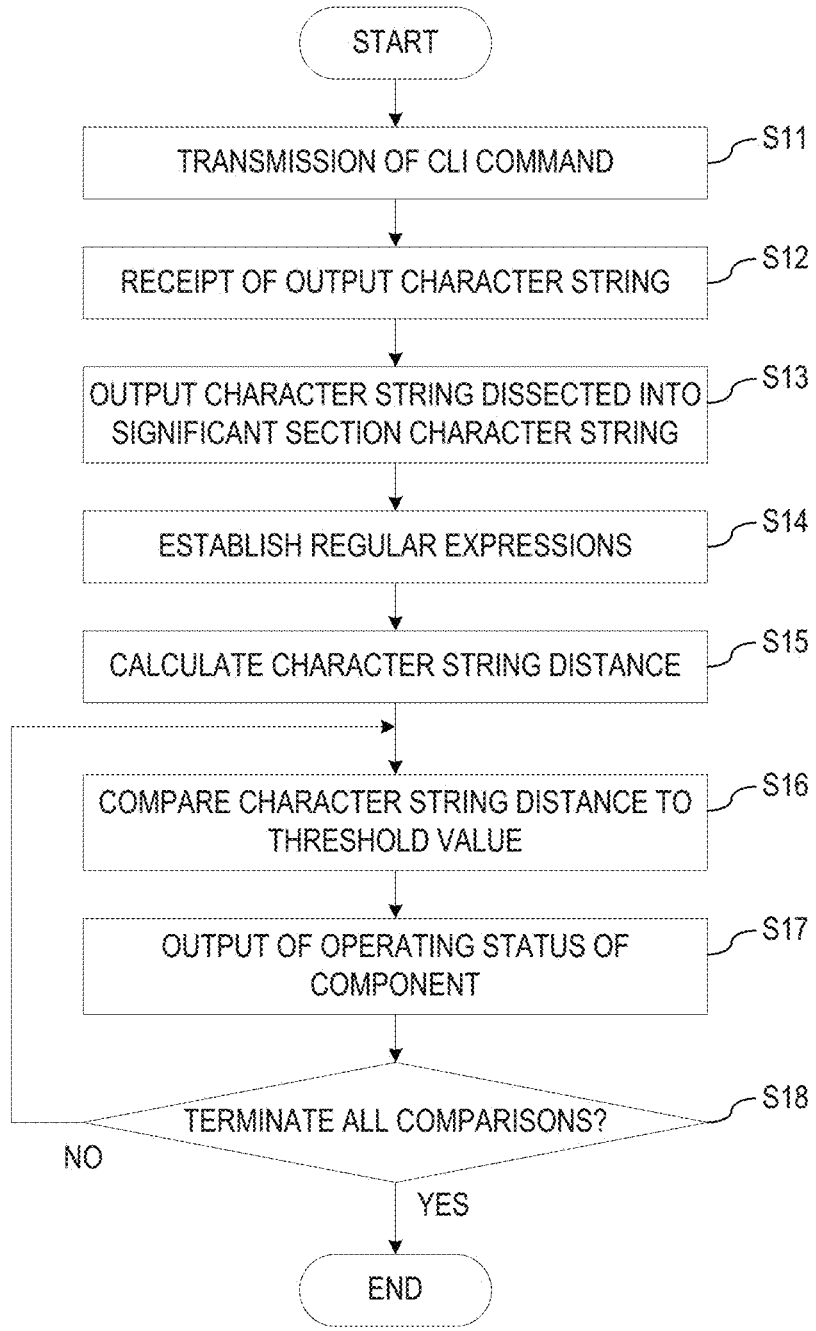
FIG. 5 is a diagram depicting the flow of an embodiment of the method of the present invention.
Figure 6:
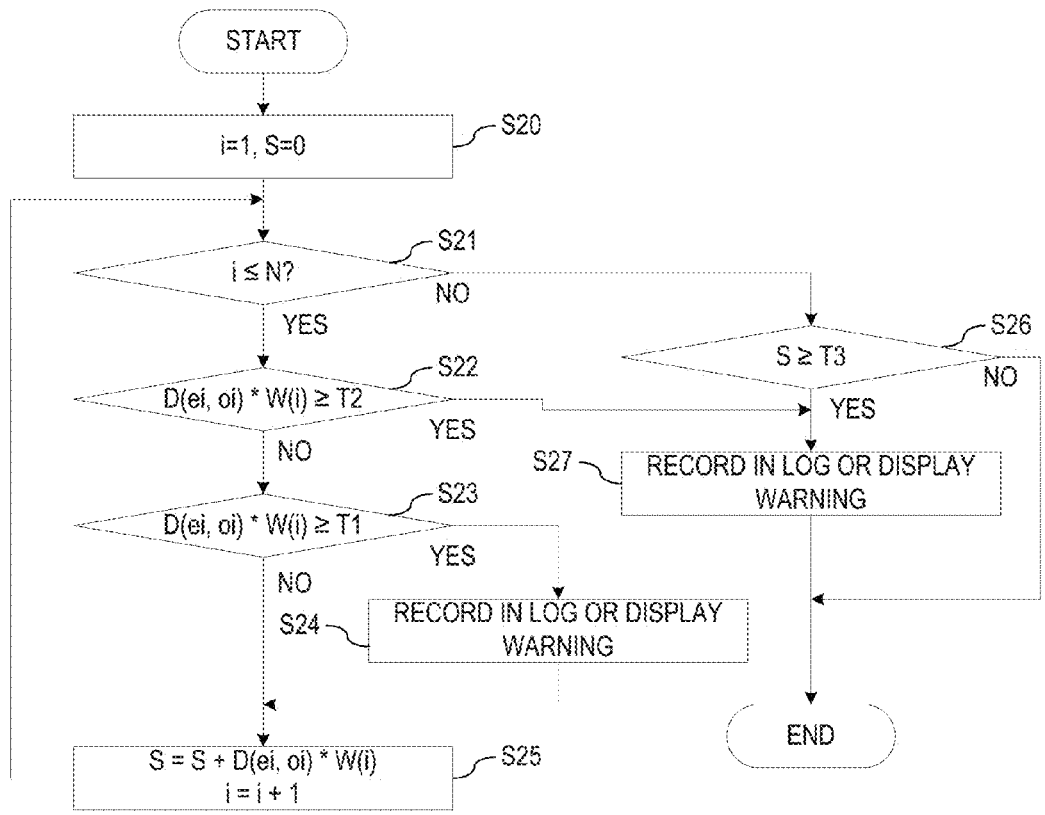
FIG. 6 is a diagram depicting the flow of an embodiment of the method of the present invention.

Next, while referring to FIG. 5 and FIG. 6, the flow is described for an embodiment of the method of the present invention that uses the aforementioned (A) output character string, (B) significant character substring, (C) regular expression, and (D) character string distance. Note that the flow of the method in both diagrams is performed by the computer (PC 20) illustrated in FIG. 2, by executing corresponding software.

First, FIG. 5 is referenced. In step S11, the computer transmits the CLI command to the component. The CLI command is the aforementioned df command or the like for example. In step S12, the computer receives an output character string for the CLI command from the component. The output character string is an output character string or the like for the aforementioned df command depicted in FIG. 3 for example. In step S13, the received output character string is dissected into significant character substrings that include a label character string indicating the meaning of the data, and a data character string that expresses the data itself. The significant character substring can further include a character string for an easy read of data string as described above while referring to FIG. 4.

In step S14, a regular expression is set corresponding to each acquired significant character substring. The contents of the regular expression are as described above, and the defined regular expressions can be stored in recording means (memory) in advance for each significant character substring, and these can be accessed and used. In step S15, the difference between each set regular expression and the corresponding significant character substring is calculated as the character string distance. The calculation of the character string distance is as described for the aforementioned (D) character string distance D(ei, oi), and each significant character substring is calculated.

In step S16, the calculated character string distance is compared with a corresponding predetermined threshold value. The predetermined threshold is set individually for the corresponding significant character substring (label character string). The three following thresholds values are defined as thresholds for example:
  T1: Loose threshold
  T2: Strict threshold (for example, T2=T1*2)
  T3: Overall threshold (for example, T3=T1*N, N is the total number of significant character substrings)

These threshold values are statically defined based on the characteristics of the system (components). The comparison between the three threshold values T1 through T3 and the character string distance D (ei, oi) is described below while referring to FIG. 6.

In step S17 the operating state of the component is output based on the comparison results of S16. Specifically, based on the results of the comparison, at least one of, the results are left in a log of the recording device, or a warning is displayed by the display device, (is performed). In step S18, a determination is made as to whether or not all of the comparisons between the character string distance and the corresponding threshold value are completed. If the determination result is No, the process returns to step S16, and then steps S16 and S17 are repeated. If the determination result is Yes, the series of processes terminates. The user can later confirm the operating status of the component by looking at the information (results) recorded in the log. Furthermore the user can immediately halt operation of the component when a warning is displayed by the display device.

Next, comparison of the aforementioned three threshold values T1 through T3 and the character string distance D(ei, oi) is described while referring to FIG. 6. In step S20, the character string distance D(ei, oi) is initialized. In other words, i is set to 1 and S is set to 0. The meaning of S is described below. In step S21, a determination is made as to if $i \leq N$. If the result is Yes, in step S22, a determination is made as to if D(ei, oi)*W(i)≥T2. Here, T2 is the strict threshold value described above.

On the other hand, W(i) represent a weighting coefficient for the $i^{th}$ significant character substring. W(i) expresses the importance of the problem with regards to ei and oi being different. For example, for the $i^{th}$ significant character substring, if a wanting is desired if the previously prepared regular expressions ei and oi are even slightly different, W(i) will be set to a larger value. Conversely, if there is no big problem even though the regular expression ei differs somewhat from output oi W(i) is set to a small value.

If the determination of step S22 is Yes, either the result is logged in step S27, and/or a warning is displayed. If the result in step S22 is No, in step S23, a determination is made as to if D(ei, oi)*W(i)≥T1. Here, T1 is the loose threshold value described above. If the determination is Yes, either the result is logged in step S24, and/or a warning is displayed. If the result in step S23 is No, in step S25, S is set to S+D (ei, oi)*W(i), i=i+1, the process returns to step S21, and the series of steps is repeated. Herein, S is the sum of D(ei, oi)*W(i), or in other words, Σ(D(ei, oi)*W(i), i=1 to N).

If the result in step S21 is No, in step S26, a determination is made as to if S≥T3. In other words, the sum S of D(ei, oi)*W(i), (ΣD(ei, oi), i=1 to N) is compared to the aforementioned overall threshold value. If the determination is Yes, either the result is logged in step S27, and/or a warning is displayed. If the result in step S26 is No, the series of processors is terminated.

The series flow (steps) depicted in FIG. 6 can be comprehensively expressed as described below.
  (a) When CLI command C is executed, the output string is dissected into significant character substrings O(C)={o1, ... , oN}.
  (b) The product of the character string distance D(ei, oi) and the weighting W(i) is determined as D(ei, oi)*W(i) for each i, using the expected output P prepared beforehand.
  (c) The product D(ei, oi)*W(i) and the threshold values T1, T2 are compared.
  (d) If the product D(ei, oi)*W(i) is T2 or larger, a log output or warning display is performed, and the process is terminated.

(e) If the product D(ei, oi)*W(i) is T1 or larger, a tog output or warning display is performed, but component operation is continued.

(f) Furthermore, when considering the sum of the products D(ei, oi)*W(i) for all outputs oi, the value of D(ei, oi)*W(i) total S (ΣD(ei, oi)*W(i), i=1 to N) is compared to T3 as a last step, and if the sum is T3 or higher, a log output or warning display is performed and the process is terminated.

The method of the present invention described in detail by the aforementioned embodiment enables detection and confirmation of the operating status of a system (components, modules, devices, and the like) for testing, by analyzing an output character string for the CLI command, even if the output format for the CLI command has changed, and this operation can make an appropriate response such as terminating the operation, or the like.

Embodiments of the present invention were described while referring to the drawings. However, the present invention is not restricted to these embodiments. The present invention can be embodied by various improvements, corrections, and variations, based on the knowledge of one skilled in the art, within a scope that does not violate the gist thereof.

The invention claimed is:

1. A method in a computer system for detecting an operating state of a component in the computer system comprising a plurality of components, the method comprising:

transmitting a command line interface (CLI) command via a command line interface to the component;

receiving an output character string from the component responsive to the CLI command;

dissecting a set of significant character substrings from the output character string, wherein each significant character substring comprises a label character string indicating a meaning of the output character string and a data character string expressing data of the output character string;

setting a regular expression corresponding to each significant character substring of the set of significant character substrings thereby forming a set of regular expressions;

calculating a difference between each regular expression of the set of regular expressions and each significant character substring corresponding to the regular expression as a character string distance thereby forming a set of calculated character string distances;

comparing each calculated character string distance in the set of calculated character string distances to a set of corresponding predetermined thresholds, wherein comparing each calculated character string distance to the set of corresponding predetermined thresholds comprises:

setting a first value i to 1 and a second value S to 0, wherein the first value i identifies a particular calculated character string distance in the set of calculated character string distances associated with an $i^{th}$ significant character substring being analyzed and wherein S identifies a sum of the calculated character string distance times a weighting coefficient W(i) for the $i^{th}$ significant character substring;

determining whether the first value i is less than or equal to a total number N of the set of significant character substrings;

responsive to the first value i being less than or equal to the total number N, determining whether the calculated character string distance times the weighting coefficient W(i) for the $i^{th}$ significant character substring is greater than or equal to a strict threshold T2;

responsive to the calculated character string distance times the weighting coefficient W(i) for the $i^{th}$ significant character substring being greater than or equal to the strict threshold T2, either logging a result or displaying a warning, and ending the comparison of each calculated character string distance to the set of corresponding predetermined thresholds;

responsive to the calculated character string distance times the weighting coefficient W(i) for the $i^{th}$ significant character substring being less than the strict threshold T2, determining whether the calculated character string distance times the weighting coefficient W(i) for the $i^{th}$ significant character substring is greater than or equal to a loose threshold T1;

responsive to the calculated character string distance times the weighting coefficient W(i) for the $i^{th}$ significant character substring being greater than or equal to the loose threshold T1, either logging a result or displaying a warning, setting the second value S to the second value S plus the calculated character string distance times the weighting coefficient W(i) for the $i^{th}$ significant character substring, increasing the first value i by 1, and repeating the process for the next calculated character string distance;

responsive to the calculated character string distance times the weighting coefficient W(i) for the $i^{th}$ significant character substring being less than the loose threshold T1, setting the second value S to S plus the calculated character string distance times the weighting coefficient W(i) for the $i^{th}$ significant character substring, increasing the first value i by 1, and repeating the process for the next calculated character string distance;

responsive to the first value i being greater than the total number N, determining whether the second value S is greater than or equal to an overall threshold T3;

responsive to the second value S being greater than or equal to the overall threshold T3, either logging a result or displaying a warning, and ending the comparison of each calculated character string distance to the set of corresponding predetermined thresholds; and responsive to the second value S being less than the overall threshold T3, ending the comparison of each calculated character string distance to the set of corresponding predetermined thresholds; and outputting the operating state of the component based on results of the comparison.

2. The method according to claim 1, wherein each significant character substring further includes a character string for making the output of the output character string easier for a user to view, wherein the character string for making the output of the data character string of the output character string easier for the user to view is at least one of a blank section, a delimiter, or a line break.

3. The method according to claim 1, wherein each regular expression includes the character string distance for utilization by the corresponding significant character substring.

4. The method according to claim 1, wherein calculating the character string distance calculates the character string distance using an Edit Distance.

5. The method according to claim 1, wherein outputting the operating state of the component at least performs an action of either saving the operating state to a log of a recording device or displaying art alert by a display device, when the character string distance is larger than the corresponding predetermined threshold.

6. A computer program product, for detecting an operating state of a component in a computer system, comprising a non-transitory computer readable storage medium having a computer readable program stored therein, wherein the computer readable program, when executed on a computing device, causes the computing device to:
- transmit a command line interface (CLI) command via a command line interface to the component;
- receive an output character string from the component responsive to the CLI command;
- dissect a set of significant character substrings from the output character string, wherein each significant character substring comprises a label character string indicating a meaning of the output character string and a data character string expressing data of the output character string;
- set a regular expression corresponding to each significant character substring of the set of significant character substrings thereby forming a set of regular expressions;
- calculate a difference between each regular expression of the set of regular expressions and each significant character substring corresponding to the regular expression as a character string distance thereby forming a set of calculated character string distances;
- compare each calculated character string distance in the set of calculated character string distances to a set of corresponding predetermined thresholds, wherein the computer readable program to compare each calculated character string distance to the set of corresponding predetermined thresholds further causes the computing device to:
  - set a first value i to 1 and a second value S to 0, wherein the first value i identifies a particular calculated character string distance in the set of calculated character string distances associated with an $i^{th}$ significant character substring being analyzed and wherein S identifies a sum of the calculated character string distance times a weighting coefficient W(i) for the $i^{th}$ significant character substring;
  - determine whether the first value is less than or equal to a total number N of the set of significant character substrings;
  - responsive to the first value i being less than or equal to the total number N, determine whether the calculated character string distance times the weighting coefficient W(i) for the $i^{th}$ significant character substring is greater than or equal to a strict threshold T2;
  - responsive to the calculated character string distance times the weighting coefficient W(i) for the $i^{th}$ significant character substring being greater than or equal to the strict threshold T2, either log a result or display a warning, and end the comparison of each calculated character string distance to the set of corresponding predetermined thresholds;
  - responsive to the calculated character string distance times the weighting coefficient W(i) for the $i^{th}$ significant character substring being less than the strict threshold T2, determine whether the calculated character string distance times the weighting coefficient W(i) for the $i^{th}$ significant character substring is greater than or equal to a loose threshold T1;
  - responsive to the calculated character string distance times the weighting coefficient W(i) of the $i^{th}$ significant character substring being greater than or equal to the loose threshold T1, either log a result or display a warning, set the second value S to the second value S plus the calculated character string distance times the weighting coefficient W(i) for the $i^{th}$ significant character substring, increase the first value i by 1, and repeat the process for the next calculated character string distance;
  - responsive to the calculated character string distance times the weighting coefficient W(i) for the $i^{th}$ significant character substring being less than the loose threshold T1, set the second value S to S plus the calculated character string distance times the weighting coefficient W(i) for the $i^{th}$ significant character substring, increase the first value i by 1, and repeat the process for the next calculated character string distance;
  - responsive to the first value i being greater than the total number N, determine whether the second value S is greater than or equal to an overall threshold T3;
  - responsive to the second value S being greater than or equal to the overall threshold T3, either log a result or display a warning, and end the comparison of each calculated character string distance to the set of corresponding predetermined thresholds; and
  - responsive to the second value S being less than the overall threshold T3, end the comparison of each calculated character string distance to the set of corresponding predetermined thresholds; and
- output the operating state of the component based on results of the comparison.

7. The computer program product of claim 6, wherein each significant character substring further includes a character string for making the output of the output character string easier for a user to view, wherein the character string for making the output of the data character string of the output character string easier for the user to view is at least one of a blank section, a delimiter, or a line break.

8. The computer program product of claim 6, wherein each regular expression includes the character string distance for utilization by the corresponding significant character substring.

9. The computer program product of claim 6, wherein the computer readable program to calculate the character string distance further causes the computing device to calculate the character string distance using an Edit Distance.

10. The computer program product of claim 6, wherein the computer readable program to output the operating state of the component further causes the computing device to perform at least one of saving the operating state to a log of a recording device or displaying an alert by a display device, when the character string distance is larger than the corresponding predetermined threshold.

11. A system comprising:
- a processor; and
- a memory coupled to the processor, wherein the memory comprises instructions which, when executed by the processor, cause the processor to:
- transmit a command line interface (CLI) command via a command line interface to the component;
- receive an output character string from the component responsive to the CLI command;
- dissect a set of significant character substrings from the output character string, wherein each significant character substring comprises a label character string indicating a meaning of the output character string and a data character string expressing data of the output character string;
- set a regular expression corresponding to each significant character substring of the set of significant character substrings thereby forming a set of regular expressions;

calculate a difference between each regular expression of the set of regular expressions and each significant character substring corresponding to the regular expression as a character string distance thereby forming a set of calculated character string distances;

compare each calculated character string distance in the set of calculated character string distances to a set of corresponding predetermined thresholds, wherein the instructions to compare each calculated character string distance to the set of corresponding predetermined thresholds further cause the processor to:

set a first value i to 1 and a second value S to 0, wherein the first value i identifies a particular calculated character string distance in the set of calculated character string distances associated with an $i^{th}$ significant character substring being analyzed and wherein S identifies a sum of the calculated character string distance times a weighting coefficient W(i) for the $i^{th}$ significant character substring;

determine whether the first value i is less than or equal to a total number N of the set of significant character substrings, responsive to the first value i being less than or equal to the total number N, determine whether the calculated character string distance times the weighting coefficient W(i) for the $i^{th}$ significant character substring is greater than or equal to a strict threshold T2;

responsive to the calculated character string distance tunes the weighting coefficient W(i) for the $i^{th}$ significant character substring being greater than or equal to the strict threshold T2, either log a result or display a warning, and end the comparison of each calculated character string distance to the set of corresponding predetermined thresholds;

responsive to the calculated character string distance times the weighting coefficient W(i) for the $i^{th}$ significant character substring being less than the strict threshold T2, determine whether the calculated character string distance times the weighting coefficient W(i) for the $i^{th}$ significant character substring is greater than or equal to a loose threshold T1;

responsive to the calculated character string distance times the weighting coefficient W(i) for the $i^{th}$ significant character substring being greater than or equal to the loose threshold T1, either log a result or display a warning, set the second value S to the second value S plus the calculated character string distance times the weighting coefficient W(i) for the $i^{th}$ significant character substring increase the first value i by 1, and repeat the process for the next calculated character string distance;

responsive to the calculated character string distance times the weighting coefficient W(i) for the $i^{th}$ significant character substring being less than the loose threshold T1, set the second value S to S plus the calculated character string distance times the weighting coefficient W(i) for the $i^{th}$ significant character substring, increase the first value i by 1, and repeat the process for the next calculated character string distance;

responsive to the first value i being greater than the total number N, determine whether the second value S is greater than or equal to an overall threshold T3;

responsive to the second value S being greater than or equal to the overall threshold T3, either log a result or display a warning, and end the comparison of each calculated character string distance to the set of corresponding predetermined thresholds; and responsive to the second value S being less than the overall threshold T3, end the comparison of each calculated character string distance to the set of corresponding predetermined thresholds; and output the operating state of the component based on results of the comparison.

12. The system of claim 11, wherein each significant character substring further includes a character string for making the output of the output character string easier for a user to view, wherein the character string for making the output of the data character string of the output character string easier for the user to view is at least one of a blank section, a delimiter, or a line break.

13. The system of claim 11, wherein each regular expression includes the character string distance for utilization by the corresponding significant character substring.

14. The system of claim 11, wherein the instructions to calculate the character string distance further causes the processor to calculate the character string distance using an Edit Distance.

15. The system of claim 11, wherein the instructions to output the operating state of the component further causes the processor to perform at least one of saving the operating state to a log of a recording device or displaying an alert by a display device, when the character string distance is larger than the corresponding predetermined threshold.

16. The method according to claim 1, wherein calculating the character string distance is defined as a function with the following properties: the character string distance is 0 when the significant character substring matches the regular expression, the character string distance is a real number of 0 or higher when the significant character substring fails to match the regular expression, and the character string distance is larger as the significant character substring is more different than the regular expression.

17. The computer program product of claim 6, wherein calculating the character string distance is defined as a function with the following properties: the character string distance is 0 when the significant character substring matches the regular expression, the character string distance is a real number of 0 or higher when the significant character substring fails to match the regular expression, and the character string distance is larger as the significant character substring is more different than the regular expression.

18. The system of claim 11, wherein calculating the character string distance is defined as a function with the following properties: the character string distance is 0 when the significant character substring matches the regular expression, the character string distance is a real number of 0 or higher when the significant character substring fails to match the regular expression, and the character string distance is larger as the significant character substring is more different than the regular expression.

* * * * *